Patented July 10, 1951

2,560,338

UNITED STATES PATENT OFFICE 2,560,338

CHROMIC OXIDE PRODUCTION PARTICULARLY FOR PIGMENT PURPOSES

Clifford G. Frayne, Washington, N. J., assignor to C. K. Williams & Co., East St. Louis, Ill., a corporation of Delaware No Drawing. Application May 16, 1950, Serial No. 162,399

6 Claims. (Cl. 23—145)

This invention relates to the production of chromium oxide and more particularly to the manufacture of chromic oxide pigments by the reduction of sodium chromate or dichromate with sodium thiosulfate, and calcination of the reduced product.

In the copending application of William A. Pollock filed on May 16, 1950, bearing Serial Number 162,397, a process of producing chromium oxide is described which involves reacting sodium chromate with sodium sulfide thereby forming a reaction mass containing chromium hydroxide and sodium thiosulfate, next reacting additional sodium chromate with most, if not all, of the sodium thiosulfate therein, thereby forming hydrated oxide of chromium in the reaction mass containing the chromium hydroxide and then calcining the mixed reaction product to produce chromium oxide which product may then be purified and prepared as a pigment by dissolving out the soluble salts, drying and grinding.

It has now been ascertained that when the second reaction is carried out between the chromate and the thiosulfate contained in the initial reaction product, it is possible to produce the reaction product directly in a form dry enough for immediate calcination. The chromium oxide reaction product formed being a hydrate takes up water present in the reacting mass and the exothermic heat developed during the reaction causes the mass to boil and hence evaporates a part of the water from the aqueous reaction mass. To provide a solid, dry-to-moist reaction mass, it is therefore only necessary that the amount of water initially present in the reaction mass be limited substantially to that amount taken up by the hydrate formation plus that amount vaporized from the reaction mass. The amount of water initially employed is sufficient to permit the reaction of all the sodium chromate present to go to completion.

The production of a dry-to-moist reaction mass in conventional equipment leads to considerable difficulty, for the reaction product sets as a single solid mass which cannot be removed from the vessel in any practical way. The product is hard like cement and hence no efficient means of removal is available. Also, if the solid mass were to be hacked out of the vessel, the grinding of the lumps to a uniform size for effective calcination would be difficult and expensive, if not impossible. Furthermore, such grinding would produce a toxic dust and provide a safety hazard.

An object of the present invention is to produce from sodium chromate and sodium thiosulfate a reaction mass in a form which can be easily removed from the vessel in which the reaction takes place while at the same time providing a product of sufficient dryness to permit calcination in conventional furnaces without any intermediate treatment for vaporization of contained water.

In its broadest concept, the invention may be considered to involve reacting sodium chromate with sodium thiosulfate in aqueous solution in the presence of an amount of water which upon the completion of the ensuing exothermic reaction provides a solid, dry-to-moist reaction product, subjecting the reaction mass to agitation as the mass thickens and solidifies, thereby producing the hydrated chromium oxide in the form of dry-to-moist particles, conveying said particles to a kiln and calcining the same to produce chromic oxide.

The agitation contemplated in the process of the invention must be of a type capable of maintaining the whole of the reacting mass under movement or turbulence during the progress of the reaction as solidification occurs. Accordingly, the paddles, arms or other agitating means in the reaction vessel employed should be of a shape and size causing positive movement and displacement throughout the reaction mass. This agitation is independent of or in addition to any agitation which may be applied to the fluid mass for facilitating the reaction.

A very satisfactory type of agitating apparatus is known as a dough mixer. The agitators within this vessel are large and are sufficiently powered to prevent the reaction product from setting in the form of a single solid unbroken mass. When the reaction product solidifies, the agitating paddles or arms cause the product to form or break up into particles which can be easily conveyed or flowed from the vessel.

The process is particularly applicable to the production of chromic oxide from the impure aqueous reaction products containing chromium hydroxide and sodium thiosulfate as produced by the process of the hereinbefore mentioned Pollock application. The chromium oxide in such products is semi-gelatinous and the thiosulfate cannot be economically separated therefrom. The process employing the present invention avoids this separation step and delays the purification of the chromium compounds until after calcination when an easily performed purification can be carried out while at the same time the thiosulfate content is utilized for the production of additional chromium compound to be calcined with the chromium hydroxide.

In accordance with one procedure under the invention, the dry-to-moist solidified reaction mass is retained in the reaction vessel under agitation until the particles are reduced to a satisfactorily small size. This product may then be conveyed directly to the calcinator without further grinding or other treatment. It is preferred, however, for more efficient utilization of the equipment that as soon as the reaction product has solidified into particles capable of being easily conveyed from the reaction vessel that the reaction product be removed and thereafter crushed as in a sawtooth crusher and that the resulting uniform product be then fed to the calcinator.

The movement or agitation of the reaction mass during solidification provides agglomerated particles of a texture capable of being easily reduced to an adequately uniform size such that a uniformly calcined mass is obtained.

The reaction for producing high grade chromium oxide may be accomplished simply by mixing sodium chromate with an aqueous solution of sodium thiosulfate. The chromate may be in the form of the solution or in the form of crystals. As hereinbefore stated, it is necessary only that the amount of water in the reaction mass be sufficient (1) to provide the mobility required to permit the reaction to go to completion and (2) to provide a solid dry-to-moist reaction product upon completion of the exothermic reaction. The preferred procedure involves adding sodium chromate or sodium dichromate to a solution of sodium thiosulfate at a rate which avoids too violent a reaction due to the exothermic heat developed.

The aqueous chromium hydroxide-sodium thiosulfate reaction product preferably employed as an initial reactant in the process of the invention may be prepared by heating together sulfur (325 mesh), sodium hydroxide and water in an amount sufficient to permit adequate mobility. An aqueous solution of sodium dichromate is then carefully added to the emulsion contained in a large precipitation vessel. The rate of introduction is regulated in order to cause the reaction to proceed to the formation of a mass containing chromium hydroxide slurried in a solution of sodium thiosulfate and sodium hydroxide.

The alkalinity of the reaction mass is then preferably reduced to a value within the range of pH 7 and pH 10 in order to provide for a lighter shade chromic oxide pigment upon calcination. This end may be accomplished by adding sulfuric acid or other suitable acid to the reaction mass during agitation until the pH value is reached which has been predetermined to provide the shade desired in the final calcined product. Reduction of the alkalinity to a pH of 7 at this stage yields the lightest shade.

In accordance with this preferred procedure of the invention, the completely or partially neutralized slurry obtained as described above or by any other suitable procedure is next reacted with sodium chromate or sodium dichromate either in solution, in the form of crystals, or as mixtures of the same as desired. In all events, the total amount of water in the reaction mass must be taken into consideration in order to provide the dry-to-moist reaction product as hereinbefore described.

The amount of sodium chromate added is based on the amount of sodium thiosulfate present and the amount may be the theoretically required quantity, but stronger pigments are obtained by using from 75 to 90 per cent of the theoretical amount required. Since the sodium sulfite formed as a by-product is also a reducing agent, the amount of chromate added can be increased to take advantage of its reducing action. During the reaction, constant agitation of the character hereinbefore described is employed, and as a result the final reaction product is obtained as a moist-to-dry solid mass of particles. These particles are then conveyed directly to a kiln or through a sawtooth crusher if greater uniformity is required. The chromic oxide containing various salt impurities as obtained from the calcining kiln is next treated to dissolve out the soluble salts, then dried and ground.

SPECIFIC EXAMPLE

Sixty-five gallons of a slurry obtained by the reduction of sodium dichromate with sodium sulfide and composed essentially of chromium hydroxide and sodium thiosulfate are introduced into a dough mixer and thereafter during agitation 30 gallons of a solution of sodium dichromate of 10 pounds per gallon strength are added. An exothermic reaction occurs and eventually the reaction mass begins to thicken due to the water being removed by formation of chromium oxide hydrated crystals and due to evaporation. The reaction mass is eventually obtained in the form of dry-to-moist particles and is composed of chromium hydroxide and chromium oxide compounds (the equivalent of approximately 280 pounds of $Cr_2O_3$) and one or more soluble salt impurities.

This reaction product is then flowed or conveyed from the dough mixer either directly to the kiln or first through a sawtooth crusher and then to the kiln.

In the table set out below, the particle size distribution of the product as obtained from the dough mixer is compared with that obtained after the crusher operation, the reaction product in this instance being removed from the dough mixer without waiting for the agitating arms to break up the larger particles into smaller size.

*Particle size distribution*

| | As removed from the dough mixer (percentage) | After being crushed (percentage) |
|---|---|---|
| On No.— | | |
| 4 mesh | 36.15 | 2.06 |
| 15 mesh | 34.90 | 50.00 |
| 20 mesh | 8.14 | 12.88 |
| 30 mesh | 7.54 | 11.34 |
| 40 mesh | 3.62 | 5.67 |
| Less than 40 mesh | 9.65 | 18.05 |

From this table it will be noticed that the initial product containing more than one-third of the particles large enough to be retained on number 4 mesh screen is reduced to a product in which substantially all of the product is sufficiently small to pass through said screen. The crushed particles are all sufficiently small to permit adequately uniform calcination to provide a uniform chromic oxide pigment.

In the kiln the reaction mass is converted to chromic oxide of pigment grade by heating the same to a temperature of from 1650° to 1950° F. Higher temperatures heretofore found necessary in related processes are not necessary.

Upon completion of the calcination, the product or clinker obtained is composed of a mixture of chromic oxide and sodium sulfate and small amounts of other soluble salt impurities. Next the mixture is cooled and then introduced into dissolving tanks where dissolution of the sodium sulfate and other soluble impurities is effected by agitation in the presence of added water. The solution of the soluble salts obtained is then removed from the discrete chromic oxide particles by decantation or filter pressing or a combination of both, and then washing. Thereupon the oxide may be pressed to approximately 24 per cent moisture content and then dried suitably on a moving apron drier. The dry product obtained is next pulverized, stored and then packed for shipment. A high grade chromic oxide pigment is thereby obtained.

The process of the present invention employing the limited amounts of water and agitation during reaction thereby to form hydrated chromium oxide in moist-to-dry form has a number of advantages including (1) the elimination of any necessity for removing water by evaporation prior to calcining, (2) the avoidance of the necessity for removing a solid hard reaction mass from the vessel, (3) elimination of any necessity for grinding a hard cement-like product in order to provide a mass of sufficiently small and uniform particles to permit satisfactory calcination in conventional kilns whether they be of rotary, reverbatory or muffle type, and (4) the reaction product in the mixer is obtained as a granular mass within the mesh size range hereinbefore revealed and as such the material is in a physical condition which makes it possible to handle it mechanically by continuous and conventional operations in ordinary material handling equipment such as belts, screw conveyors, elevators and the like.

The term "chromate" specified in the appended claims includes the dichromate as well as the monochromate and also mixtures of the same. Although only the salts and hydroxide of sodium are mentioned herein, derivatives of potassium or other alkali metals give similar results and may alternatively be employed.

It should also be understood that the present invention is not limited to the specific details as to materials, conditions and procedures herein described but that it extends to all equivalents which will occur to those skilled in the art upon consideration of the scope of the claims appended hereto.

I claim:

1. A process for producing chromic oxide for pigment purposes which comprises, reacting sodium chromate with sodium thiosulfate in aqueous solution in the presence of an amount of water which upon the completion of the exothermic reaction provides a solid, dry-to-moist reaction product, subjecting the reaction mass to agitation as the same thickens and solidifies, thereby producing the hydrated chromium oxide in the form of dry-to-moist particles instead of as a single solid mass, conveying said particles to a kiln and calcining the same, thereby producing the chromic oxide.

2. A process for producing chromic oxide for pigment purposes which comprises, bringing together sodium chromate and an aqueous reaction mass consisting essentially of chromium hydroxide and sodium thiosulfate in the presence of an amount of water which upon completion of the exothermic reaction provides a solid, dry-to-moist reaction product, agitating the reacting mass while the same thickens and solidifies thereby providing the product in particle form instead of as a single solid mass, conveying said particles to a kiln and calcining the same, thereby producing chromic oxide from the chromium hydroxide and hydrated chromium oxide formed.

3. A process for producing purified chromic oxide pigments from impure aqueous reaction products consisting essentially of chromium hydroxide and sodium thiosulfate which comprises, bringing together such aqueous reaction product and sodium chromate in the presence of an amount of water which on completion of the reaction provides a dry-to-moist reaction mass, agitating said mixture during the reaction of the sodium thiosulfate and sodium chromate thereby forming hydrated chromium oxide in admixture with the chromium hydroxide as a mass of dry-to-moist particles suitable as such for calcination, calcining said mass of particles, washing out soluble impurities in said mass and drying and grinding the same to provide a purified chromic oxide pigment.

4. A process for producing chromic oxide for pigment purposes which comprises adding sodium dichromate to an aqueous reaction mass consisting essentially of chromium hydroxide and sodium thiosulfate to provide a reaction mass having an amount of water present which upon completion of the exothermic reaction to follow provides a solid, dry-to-moist reaction product, limiting the sodium dichromate added to an amount calculated to react with 75 to 90 per cent of the sodium thiosulfate present, agitating the reacting mass until the same solidifies in particle form instead of as a single solid mass, conveying said particles to a kiln and calcining the same, thereby producing chromic oxide from the chromium hydroxide and hydrated chromium oxide formed.

5. A process for producing chromic oxide for pigment purposes which comprises reacting sodium chromate with sodium thiosulfate in aqueous solution in the presence of an amount of water which upon completion of the ensuing exothermic reaction provides a solid, dry-to-moist reaction product, agitating the reaction mass until the same solidifies in particle form, continuing such agitation until the particles are broken up into sufficiently uniform size for effective uniform calcination, conveying said particles to a kiln and calcining the same, thereby producing chromic oxide.

6. A process for producing chromic oxide for pigment purposes which comprises reacting sodium chromate with sodium thiosulfate in aqueous solution in the presence of an amount of water which upon completion of the ensuing exothermic reaction provides a solid, dry-to-moist reaction product, agitating the reacting mass until the same solidifies in particle form instead of as a single solid mass, conveying said particles through a crusher to provide sufficiently uniform particle size suitable for calcination, then conveying said particles to a kiln and calcining the same, thereby producing anhydrous chromic oxide.

CLIFFORD G. FRAYNE.

No references cited.